(12) United States Patent
Wang

(10) Patent No.: US 7,883,275 B2
(45) Date of Patent: Feb. 8, 2011

(54) FIBER GUIDING PLATFORM FOR MECHANICAL SPLICER, OPTICAL CONNECTORS, FIBER HOLDER AND METHODS

(75) Inventor: Wei-Min Wang, 4182 Georgia Ave., Palo Alto, CA (US) 94306

(73) Assignee: Wei-Min Wang, Palo Alto, CA (US)

( * ) Notice: Subject to any disclaimer, the term of this patent is extended or adjusted under 35 U.S.C. 154(b) by 0 days.

(21) Appl. No.: 12/455,106

(22) Filed: May 27, 2009

(65) Prior Publication Data
US 2010/0303418 A1    Dec. 2, 2010

(51) Int. Cl.
G02B 6/38    (2006.01)
G02B 6/36    (2006.01)
G02B 6/255   (2006.01)

(52) U.S. Cl. .............................. 385/55; 385/53; 385/67; 385/99

(58) Field of Classification Search .................. 385/99, 385/53, 67, 55; 350/96, 21
See application file for complete search history.

(56) References Cited

U.S. PATENT DOCUMENTS

| | | | |
|---|---|---|---|
| 3,914,015 A * | 10/1975 | Mc Cartney | 385/54 |
| 3,989,567 A | 11/1976 | Tardy | |
| 4,009,931 A * | 3/1977 | Malsby et al. | 385/54 |
| 4,047,796 A | 9/1977 | Kao | |
| 4,056,305 A * | 11/1977 | McCartney et al. | 385/64 |
| 4,093,341 A * | 6/1978 | Crick | 385/59 |
| 4,123,139 A | 10/1978 | Sandahl | |
| 4,217,029 A * | 8/1980 | Kao | 385/64 |
| 4,223,976 A | 9/1980 | Zangiacomi | |
| 4,378,145 A | 3/1983 | Stancati | |

(Continued)

OTHER PUBLICATIONS

"Descartes' theorem", a Wikipedia article, available online since at least Mar. 20, 2006.*

Primary Examiner—Ryan Lepisto
Assistant Examiner—Robert Tavlykaev
(74) Attorney, Agent, or Firm—Raj Abhyanker, P.C.

(57) ABSTRACT

A three rod bundle confined inside a sleeve is constructed as a light guiding fiber mechanical splicing device which is stiff, strong and precise, with no moving parts. The design also applies to splicing fibers to pre-polished optical connectors through a built-in model of this innovative mechanical splicer. Applying the Soddy circles formula and using a bin approach assists in deriving the exact rod sizes needed and sleeve bore size to accommodate the three-rod bundle, so that this apparatus can be properly designed to guide any size of light guide fibers and studs with minimum clearance. Rods of varying diameters are sorted into bins and chosen based upon the aperture desired, thus eliminating the need for tight tolerance of the diameters of the three rods. This unique design allows for construction of a precision virtual hole of very long depth, which enables two optical fiber studs to butt against each other with a core to core misalignment of less than 1 um for single mode fiber optics cables. Unlike prior arts, the sleeve holding the rods eliminates the need for any clamping mechanism to tighten a loose bundle, which induces undesirable mechanical strain. It also eliminates the need to use a fiber clamp to force the fiber studs against dimensionally unstable V or U groove alignment features which also induce undesirable mechanical strain. A fiber holder is also presented to depict the usefulness of this invention on hold fiber in position.

6 Claims, 15 Drawing Sheets

U.S. PATENT DOCUMENTS

| | | |
|---|---|---|
| 4,460,243 A | 7/1984 | Strait |
| 4,490,007 A | 12/1984 | Murata |
| 4,506,946 A | 3/1985 | Hodge |
| 4,575,182 A | 3/1986 | Hensel |
| 4,676,589 A * | 6/1987 | Miyashita et al. ............. 385/65 |
| 6,018,606 A * | 1/2000 | Sogabe et al. ............... 385/136 |

* cited by examiner

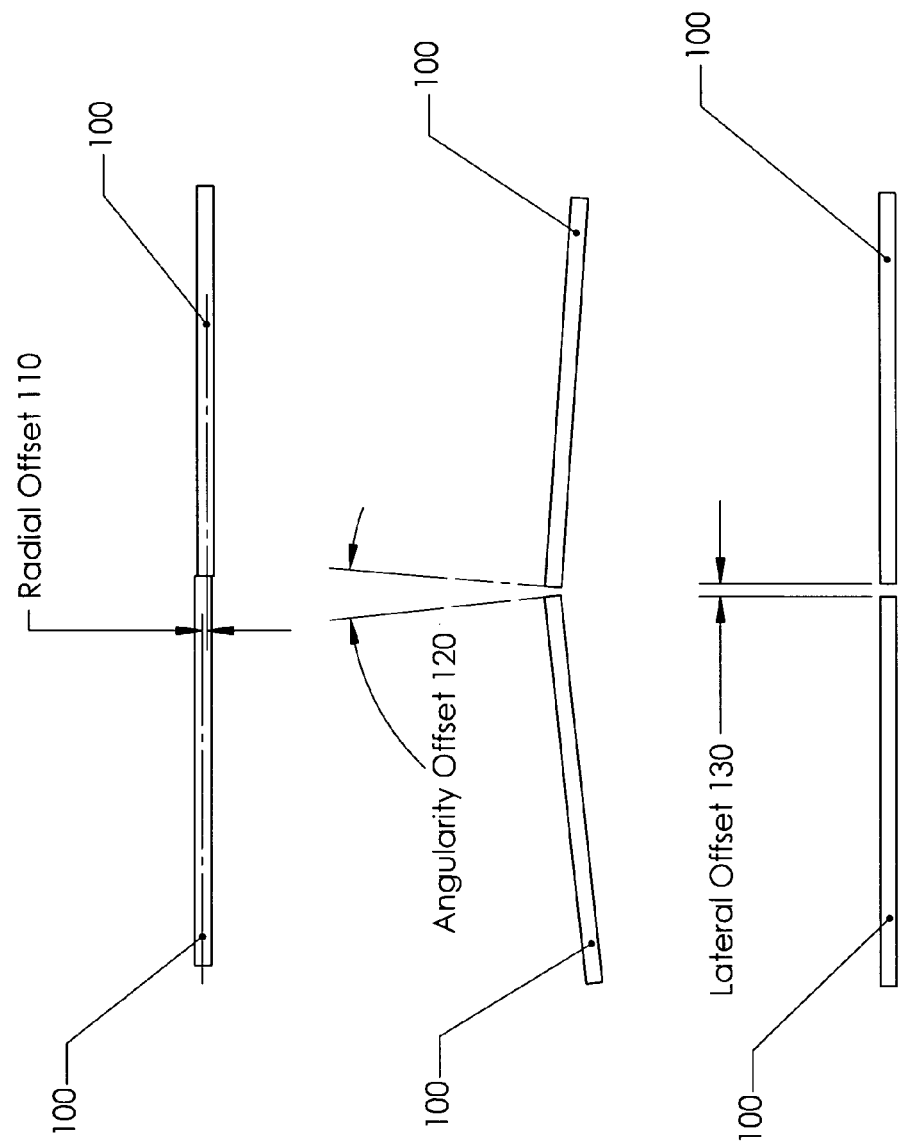

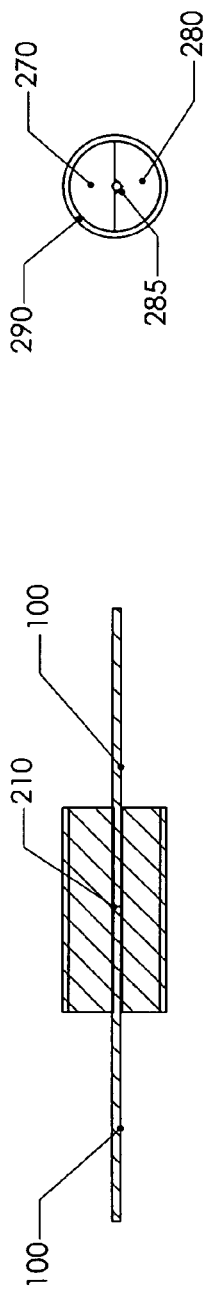
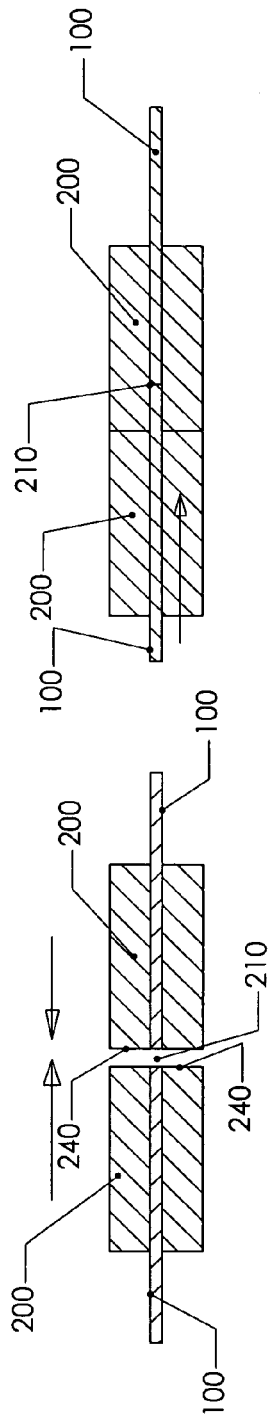
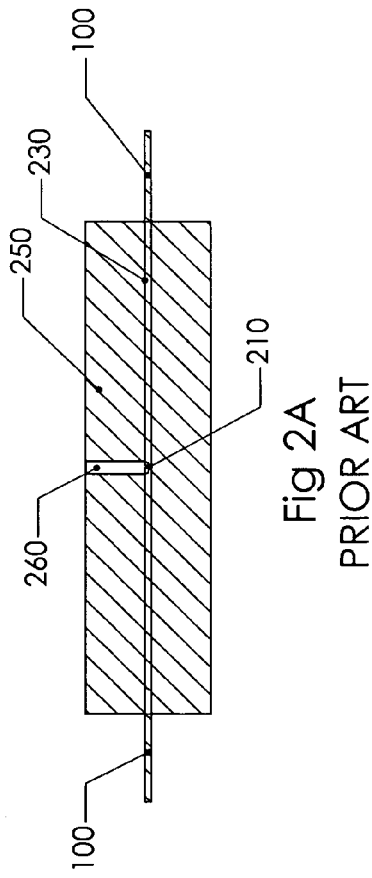
Fig 2A PRIOR ART
Fig 2B PRIOR ART
Fig 2C PRIOR ART

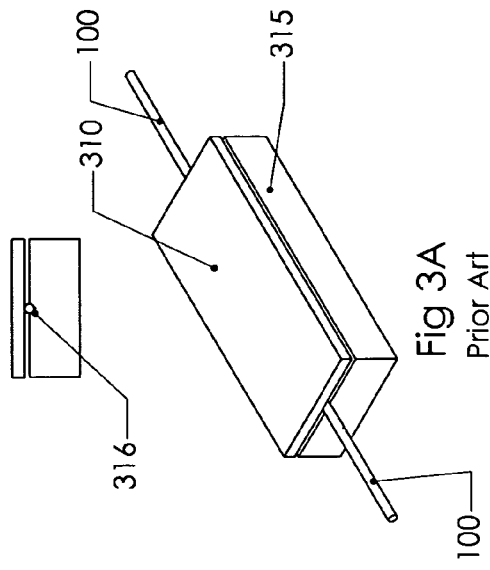
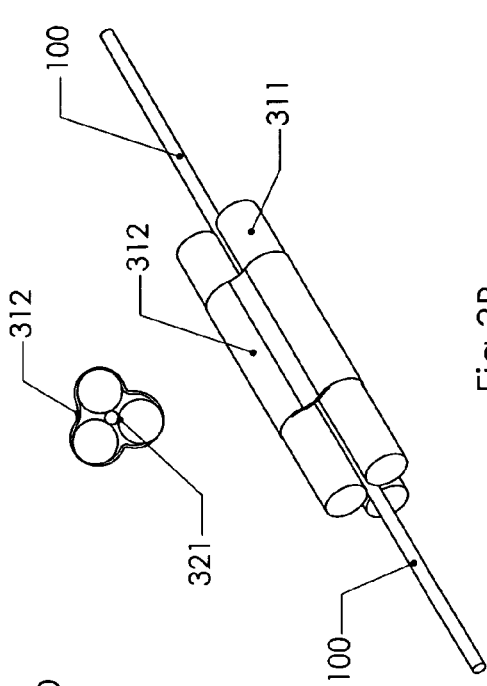
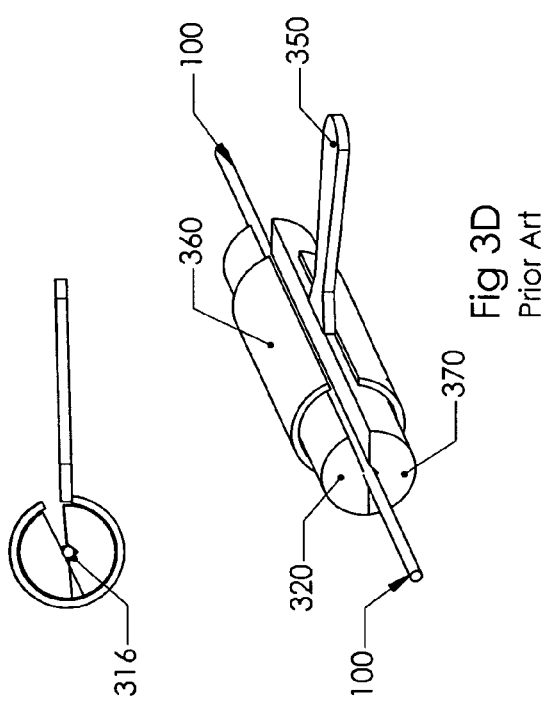
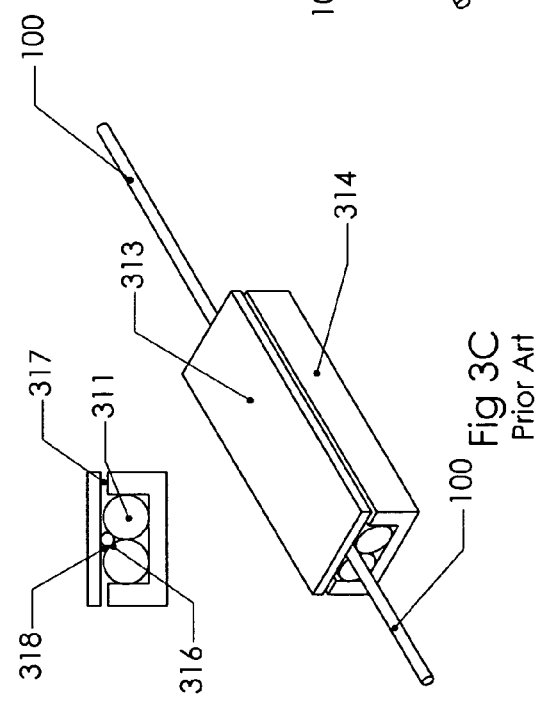

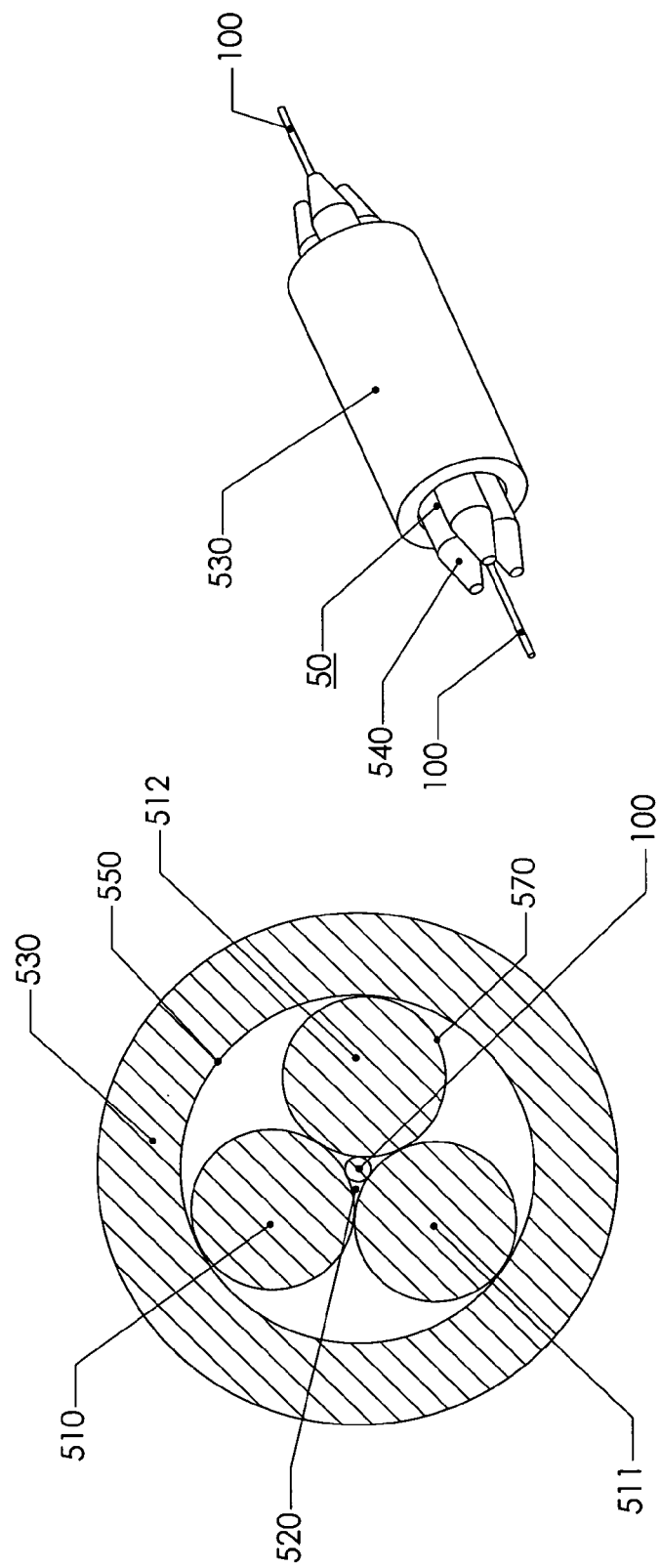

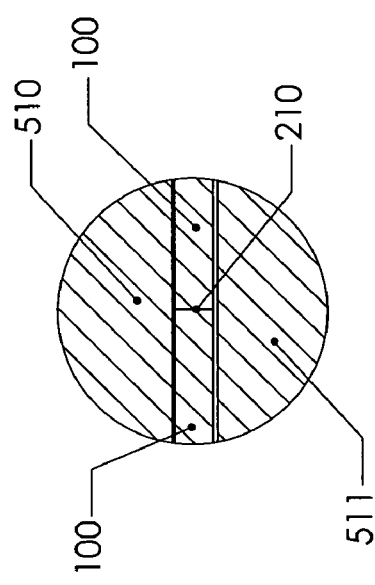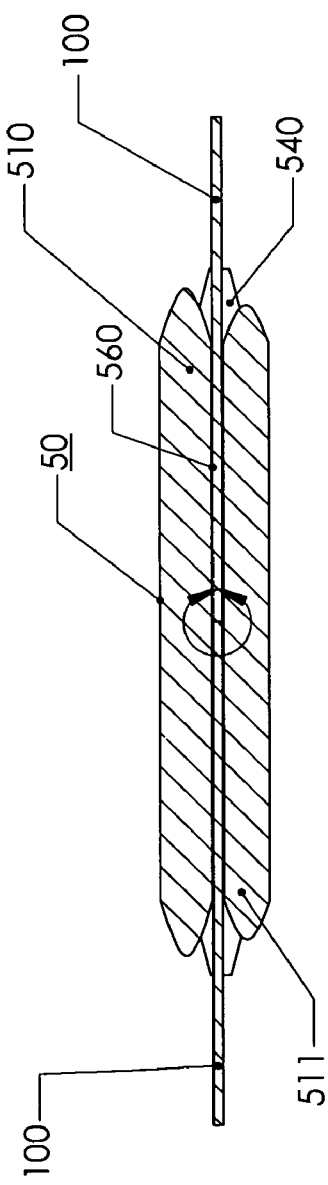

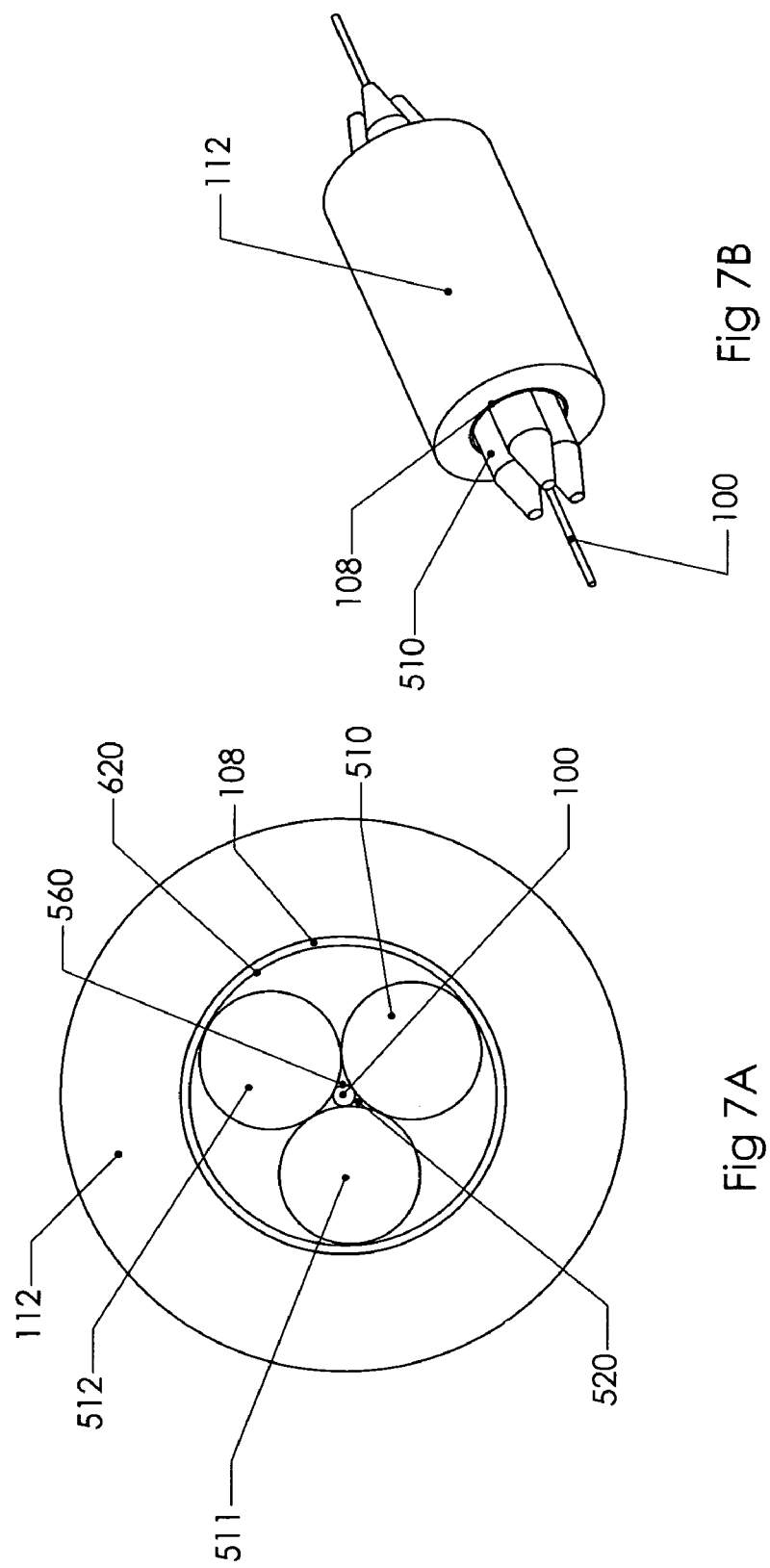

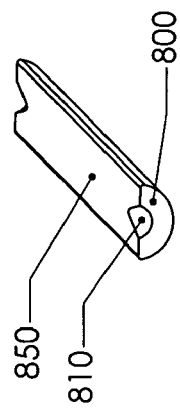
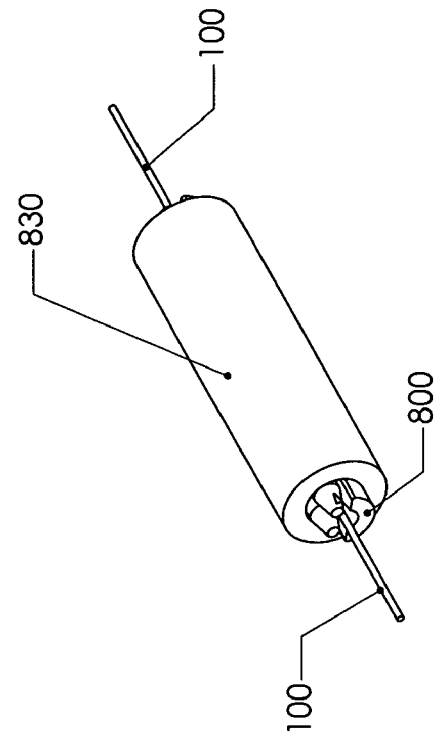
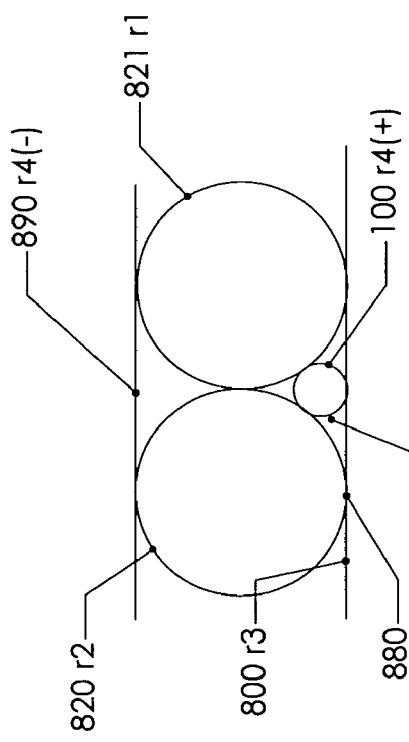
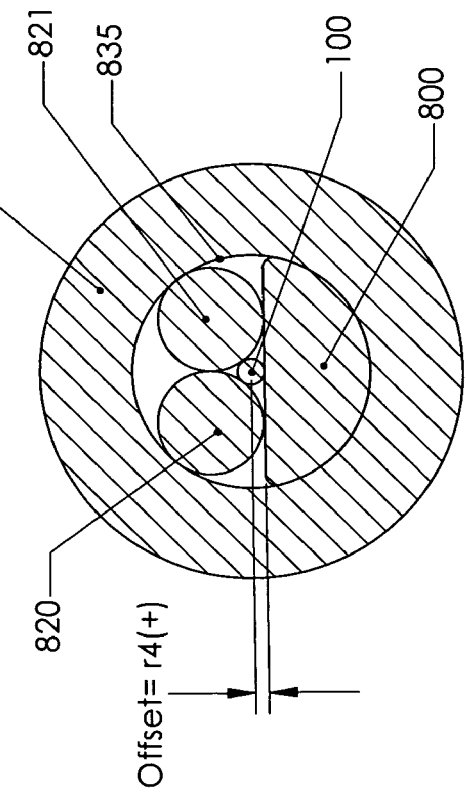

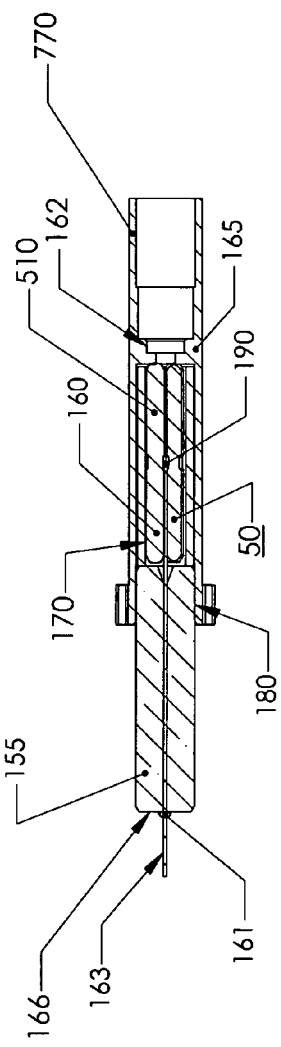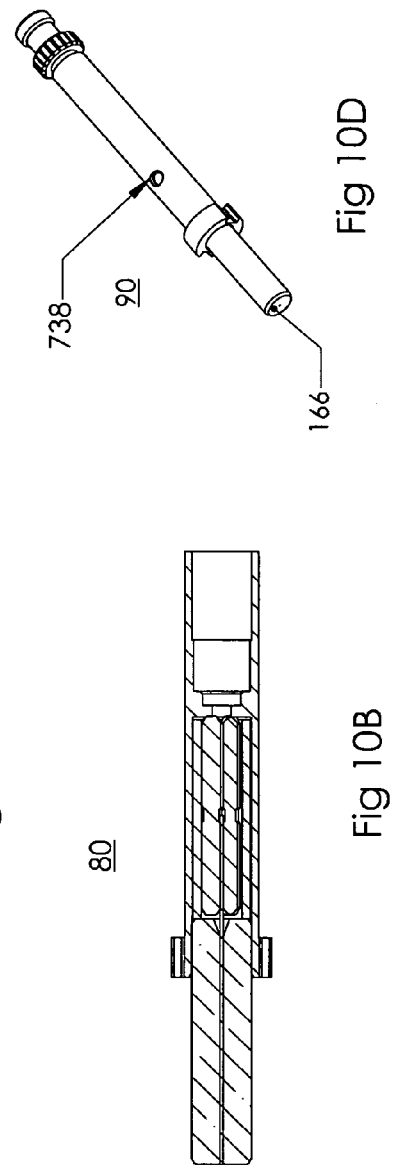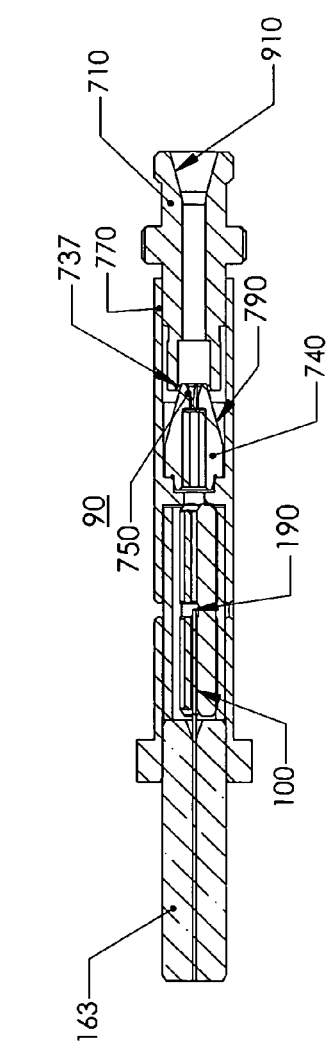

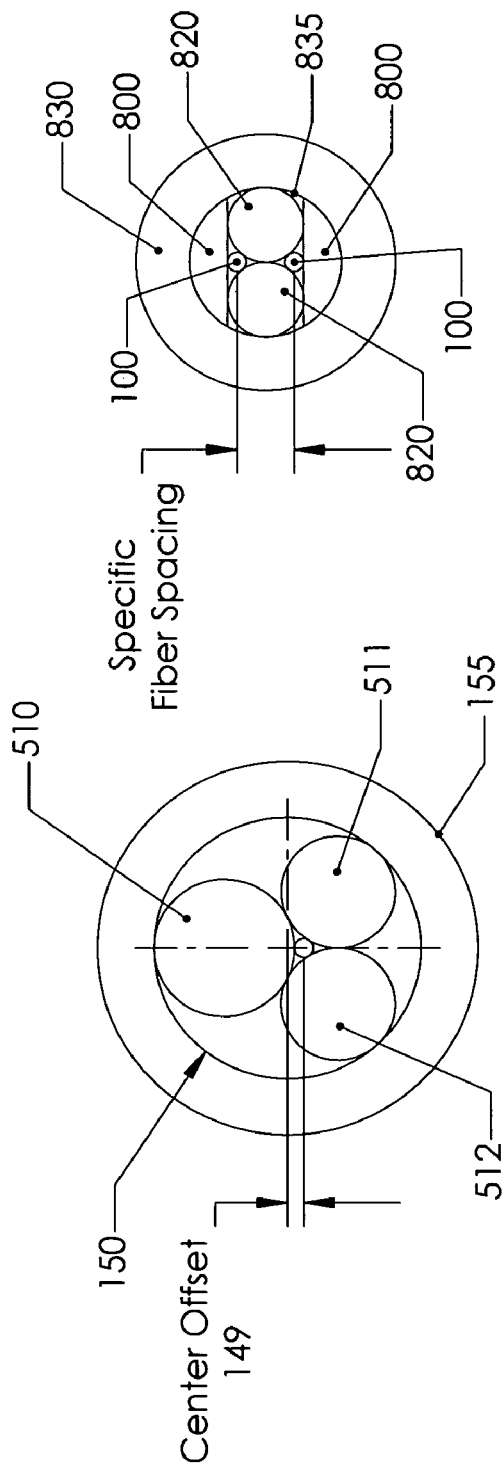

FIBER GUIDING PLATFORM FOR MECHANICAL SPLICER, OPTICAL CONNECTORS, FIBER HOLDER AND METHODS

FIELD OF INVENTION

The present invention relates to the field of optics fibers, and in particular to the essential process of mechanically splicing optics fibers with precise alignment. It also applies to optical connector terminations, optics fiber holding devices and optics fiber process holding methods.

REFERENCES CITED [REFERENCED BY U.S. PATENT DOCUMENTS]

| Pat. No. | Issue Date | Inventor |
| --- | --- | --- |
| 3,989,567 | Nov. 2, 1976 | Tardy |
| 4,047,796 | Sep. 13, 1977 | Kao et al. |
| 4,123,139 | Oct. 31, 1978 | Sandahl |
| 4,223,976 | Sep.23, 1980 | Zangiacomi et al |
| 4,378,145 | Mar. 29, 1983 | Stancati et al. |
| 4,460,243 | Jul. 17, 1984 | Strait, Jr. |
| 4,490,007 | Dec. 25, 1984 | Murata |
| 4,506,946 | Mar. 26, 1985 | Hodge |
| 4,575,182 | Mar. 11, 1986 | Hensel et al |
| 4,676,589 | Jun. 30, 1987 | Miyashita, et al. |
| 4,921,323 | May 1, 1990 | Delahanty, et al. |
| 6,981,802B2 | Jan. 3, 2006 | Sasaki, et al. |
| 6,779,931B2 | Aug. 24, 2004 | Murata, et al. |
| 4,743,084 | May 10, 1988 | Manning, et al. |
| 6,179,482B1 | Jan. 30, 2001 | Takizawa, et al. |
| 7,011,454 | Mar. 14, 2006 | Caveney, et al. |
| 7,264,410 | Sep. 4, 2007 | Doss, et al. |
| 6,741,786 | May 25, 2004 | Flower et, al. | http://en.wikipedia.org/wiki/Descartes'_theorem
http://mathworld.wolfram.com/SoddyCircles.html
Technician's Guide to Fiber Optics $2^{nd}$ Edition by Sterling, Donald
Stress effects on the performance of optical waveguides International Journal of Solids and Structures, volume 40 Issue 7, April 2003, Pages 1615-1632 by M Huang

BACKGROUND OF THE INVENTION

Optical fiber splicing involves joining two optical fibers together, which is typically accomplished either by employing a fusion splicer or a mechanical splicer, each a different type of instrument. The fusion splicer results in more reliable low loss splicing (<0.1 dB) than the mechanical splicer, but has the significant drawbacks of being very expensive, bulky and fragile and not suitable for field use. The current mechanical splicers require only a few hand tools, are portable and take up very little space, but their splicing performance is not only inferior (~0.3 dB) but also erratic due to their design. The currently available mechanical splicers, which all aim to splice optics fibers by aligning the fibers butt to butt and coupling them together, are difficult to operate and/or produce unpredictable results. The present invention provides a precision aperture mechanical splicer that addresses these shortcomings of the prior arts of mechanical splicers.

The present invention discloses a precision aperture mechanical splicer housed within a sleeve of precise diameter, that produces simple, inexpensive, reliable and stable mechanical splicing, and whose performance meets stringent optical coupling low insertion loss requirements. It designates a method for mechanical splicing that matches the performance of fusion splicers but that is much more economical and practical for field use. To illustrate the economic value of the present invention, skilled operators in the art will appreciate that, whereas a fusion splicer costs upwards of US$20K and is unwieldy and difficult for use in the field, the present invention utilizes parts that in total cost less than US$2K in the present industry. Also presented here is a pre-polished fiber optical connector that is particularly applicable for field use, including a built-in precision aperture mechanical splicer as per this invention. Also presented is a fiber holder with a precision aperture that relates the precision sleeve housing as the mechanical datum for fiber alignment.

The mechanical splicing of two optical fibers butted against each other aims to join two fibers with minimal optical power loss (e.g. insertion loss, or IL). Such low loss coupling must meet the following stringent physical requirements:

a) Two fiber stubs aligned center to center, i.e. no radial offset.
b) Two fiber stubs aligned perfectly parallel, i.e. no angular offset
c) Two flat ends of fiber studs spliced with seamless contact and no gaps, i.e. no lateral offset.

The coupling of two optical fiber studs can be stable and have high reliability if d) The connection structure is mechanically stable under a full range of operation environments, such as high/low temperatures, and can endure shock and vibration.

Achieving all four conditions simultaneously is highly difficult, due to the fact that each fiber stud is typically less than the width of a human hair, and even minimal offsets in alignment can result in significant optical power loss. In the case of single mode fiber optics, 0.3 dB IL or less is acceptable according to industry standards. All prior arts known were attempting to resolve these issues.

There have been many patents issued relating to the art of optical fiber mechanical splicing and connecting.

U.S. Pat. No. 3,989,567 by Tardy, U.S. Pat. No. 4,123,139 by Sandahl, U.S. Pat. No. 4,047,796 by Kao et al, U.S. Pat. No. 4,223,976 by Zangiacomi et al, U.S. Pat. No. 4,490,007 by Murata, and U.S. Pat. No. 5,351,371 by DeVeau, Jr. et al., were all attempting to solve mechanical splicing problems by utilizing a 3-rod bundle in order to form a straight aperture into which the two fiber studs would be inserted and aligned butt to butt.

Prior arts such as U.S. Pat. No. 4,123,139, by Sandahl and U.S. Pat. No. 4,047,796, by Kao prescribed the use of a bundle of 3 rods of equal size, with a very precise mechanical tolerance. Using planar geometry, these prior arts could calculate a precise aperture formed by the 3 equally-sized rods. However, these prior arts' high requirements for the mechanical tolerance of the rods present a significant problem—U.S. Pat. No. 4,123,139, by Sandahl specifies rod mechanical tolerance to be +/−0.00001" and U.S. Pat. No. 4,047,796, by Kao specifies rods mechanical tolerance to be +/−0.0001". All these prior arts' precise rod size calculations are based on the requirement that the three rods be of equal size, but per the state of current technology, such rods are at this time highly expensive, with their cost of production so high as to make their use very impractical. Furthermore, there is yet another difficulty presented by these prior arts. In the case that the rod size tolerance is specified to be +/−0.0001", it is still likely that the fiber will be difficult to insert into the aperture, as will be described hereinafter. Thus, these prior arts resort to using a loose rod bundle into which the fibers are inserted. This is then followed by a clamping mechanism that wraps around the rod bundle and binds the rods and fibers in the hopes that the splicing fibers will still butt against each other without losing their alignment or breaking. However, the performance of such splicers is not predictable and thus results in much wasted time and materials. These issues are well known to operators skilled in the art. Despite the existence of these patents for over 20 years, the current commercially available mechanical splicers do not use these prior arts or the method of a 3-rod bundle, except for fiber guiding. However, the present invention eliminates the need for rods with high mechanical tolerance and also eliminates the need for a clamping mechanism.

U.S. Pat. No. 4,676,589, by Miyashta, et al., attempts to solve the challenge of splicing optical fibers by using a mechanical splicer consisting of an undersized U or V-shaped groove and a semi-circular plastic insert wrapped around by a sleeve. The design is simple but does not work well, because it is difficult to manufacture a V or U groove precise enough to accommodate the extremely fine width of an optical fiber. The V or U aperture is most often either too small, thus causing the optical fiber to be difficult to insert and resulting in fiber breakage, or the grooves are too loose, thus causing too much optical insertion loss (IL).

There also exist prior mechanical splicers involving the creation of very precise through-holes, as described in U.S. Pat. No. 6,981,802B2, by Sasaki, et al. and U.S. Pat. No. 6,779,931B2 by Murata, et al. However, these splicers are extremely difficult to fabricate because it is difficult to fabricate a long, straight and precise through-bore-hole with a diameter not much larger than the size of a human hair. In addition, this type of splicer requires either an extra vent hole or a special transfer procedure in order to avoid the air piston effect that would prevent the fiber stud end-faces from butting against each other.

Due to the difficulty and imperfect nature of the precision V groove or bore hole prior splicers, there were many more attempts to solve this problem without requiring a precise V groove or through-bore-hole, such as that described in U.S. Pat. No. 4,921,323, by Delahanty et al. In essence, Delahanty and others utilized a V or U groove as the optics fiber alignment feature, along with an insert and a flat surface that were separated or loosely assembled before fiber insertion in order to facilitate the ease of fiber insertion. Once both optics fibers were inserted and butted against each other, the designs then involved either complex mechanical structures, or special polymer materials used to activate and force the optics fibers against the alignment feature. However, it is difficult to achieve reliable and repeatable splicing with such designs due to the complex mechanical structure that often causes the clamp force to apply unevenly or inconsistently, thus ending in unpredictable splicing results after clamping. The V or U groove method remains the most commonly used method of mechanical splicing in the industry today. However, operators skilled in the art are familiar with the difficulties that such splicers present, as multiple try and re-try of the splicing operation, check and double check of the splicing insertion loss are needed in order to reach satisfactory results.

The present invention also solves the difficulties involved in preparing fiber optic connectors in order to terminate fiber optic cables during field work. Such difficulties are well known. Terminating optical fibers with connectors requires skilled labor, expensive polishing equipment, consumable materials, and working space. Also required are time-consuming epoxy mixing and curing, and a tricky connector polishing process. Considering cost, time and skilled labor, it is not practical to polish a connector in the field, thus making a pre-polished connector an invaluable field component. Therefore, combining a pre-polished connector with a built-in mechanical splicer to splice the connector with a field optical fiber, so it can be terminated with the connector easily and quickly—all without a fusion splicer and a connector pigtail or connector polishing—would be highly efficient and desirable for field optics fiber installation. It would allow a field operator to restore or establish an optics connection within a few minutes.

Prior arts have sought to address this need. U.S. Pat. No. 4,743,084 by Manning et al, U.S. Pat. No. 6,179,482 B1 by Takizawa et al., U.S. Pat. No. 7,011,454, by Caveney et al, and U.S. Pat. No. 7,264,410 by Doss, et al. all attempt to incorporate a mechanical splicer with a pre-polished fiber stud connector. In order to facilitate the easy insertion of a field optics fiber, these patents either utilize "shape memory" material with radial deformable means, or a V or U groove plank and a flat surface plank in either an open or loose position. Again, after the field fiber is inserted, a clamping feature is always needed, supplied by crimping or by triggering a cam mechanism, or by removing a pry member to push a flat plank, which forces both fibers studs against alignment features. Such inventions all suffer from similar shortcomings of a complex mechanical structure. Their erratic splicing performance does not compete well with fusion splicing methods, unless used for emergency connection restoration or for applications for which optical performance is not so demanding. However, the present invention remedies these difficulties by utilizing a precision aperture mechanical splicer with a pre-polished connector. With the present invention, consistent, stable and low IL (insertion loss) performance can be expected due to its simplicity and precision, lack of clamping and actuating mechanisms, and durable mechanical structure.

The present invention also has applicability to the holding of optical fibers in any number of processes that require optical fibers to be held steadily and/or guided. The current bare optics fiber holders used to facilitate accurate fiber optics sensing or processing consist of V- or U-shaped features for fiber guiding and clamping. U.S. Pat. No. 6,741,786, by Flower et al attempts to resolve a problem common to current fiber holders that apply too much stress on the optical fiber during fiber guiding and clamping, which can result in undesirable bends or deformation of the fiber. Flower describes ways to interleave fiber guiding and holding in order to minimize the stress and bending deformation of the fiber. The present invention further improves upon the optics fiber holding methods of Flower by providing strain-less fiber guiding and involves only evenly localized Hook stress applied to the fiber outside buffer. With the present invention, the fiber position may also be easily aligned with reference datum, such as a sleeve that contains a rod bundle, for sensing and further processes. This invention can be applied to any fiber optics devices that also require optical fibers to be held precisely and steadily.

SUMMARY OF THE INVENTION

It is an object of the present invention to provide a simple, reliable and cost-effective laboratory and field installable precision aperture mechanical splicer for light wave guiding fibers, such as the fiber optics cable 700, depicted in FIG. 9.

It is a further object of the present invention to provide a method for the termination of pre-polished connectors, without fusion splicing or adhesive curing and connector polishing, depicted in FIG. 10. This invention seeks to address and ameliorate the drawbacks and deficiencies of prior arts, which have included expensive, complicated, and unwieldy mechanical design, weak structures, and unreliable performance. These drawbacks are especially significant in regards to fiber optics installation work in the field.

It is a further object of the present invention to provide an improved fiber holder for use in fiber optics devices for which steady and precise fiber holding without warping or applying damaging strain/stress to the fiber is essential.

These objects are met by utilizing an inventive rod bundle construction approach. This approach solves the prior arts' dependence on using rods of precise equal size with tight mechanical tolerance, and eliminates the use of any clamping mechanism. Rods of varying sizes are sorted according to their size by bins, and rod bundles are constructed by combining rods from various bins based on the Soddy circles configuration. With the proper selection of rods, the rod bundle's precise aperture can be constructed. It holds and guides optical fiber studs with controlled minimum clearance and consequently minimum insertion optical power loss without breaking or adversely exerting force on the fiber. With the bin sorting approach, rods may be of varying sizes and are no longer subject to the highly demanding mechanical tolerance requirements present in prior arts. By lowering the rods' mechanical tolerance requirements and thus reducing the piece part cost drastically, the present invention makes the 3-rod bundle approach to fiber optic splicing practical and reliable. This invention also incorporates a precisely defined sleeve to contain the 3-rod bundle, which further eliminates the need for any unreliable clamping mechanisms to clamp together a loose rods bundle (often resulting in butted fiber studs' separation or excessive stress/stain), as depicted by other prior arts. With the present invention, the sleeve's inner dimension (ID) containing the rod bundle corresponds to the outer Soddy circle. The position of the sleeve's outer dimension, since it is related to the aperture position in a well defined way, can be used as a reference for positioning other devices. The sleeve can also be made of material softer than the rods, with its ID undersized in such a way that the rod can be inserted by press fitting, thus allowing the sleeve ID's precision and mechanical tolerance to be less demanding.

BRIEF DESCRIPTION OF THE DRAWINGS

These and other features, aspects and advantages of the present invention will become better understood with regard to the following description, appended claims and accompanying drawings, where:

FIG. 1 illustrates optical coupling requirements for splicing with minimum or no radial, angular, or lateral offsets.

FIG. 2A illustrates a prior art mechanical splicer utilizing a straight through-hole to align optical fiber studs for coupling.

FIG. 2B illustrates a prior art mechanical splicer utilizing a special fiber transfer procedure to avoid air trapped in the splice.

FIG. 2C illustrates a prior art mechanical splicer with two semi-circular inserts and one insert with a V groove. The inserts are made of compliance material and an undersized V aperture for optics fiber studs alignment.

FIG. 3A illustrates a prior art typical V groove design which uses a press plate to push fibers to align against a V groove after optics fibers are butted together.

FIG. 3B illustrates prior art 3 rods that are bundled together loosely for fibers to be inserted, after which a mechanism such as heating heat shrinkable tube is used to wrap the bundle together.

FIG. 3C illustrates a prior art 2 rods and one press plate design.

FIG. 3D is a prior art splicer design that uses a V or U groove and flat inserts which are assembled loosely. A clamp clamps the inserts together after the insertion of the optical fiber.

FIG. 5a illustrates a cross section view of an embodiment of a rod bundle employing the basic structure of the present invention, based on Soddy Circles.

FIG. 5b illustrates an external view of the embodiment of FIG. 5a.

FIG. 6A is a cutaway view of the embodiment of FIG. 5a from an axial direction.

FIG. 6B is an enlargement of the central region of FIG. 6A.

FIG. 7A is an isometric view showing an alternative embodiment, with the sleeve lined with elastic material and with an undersized rod bundle.

FIG. 7b is an external view of the embodiment of FIG. 7a.

FIG. 8a is a cross sectional view of an alternative rod bundle embodiment utilizing a special case of the Soddy circle configuration, in which the virtual bore hole is constructed by two rods and a semicircular insert contained by a sleeve.

FIG. 8b illustrates an external view of the embodiment of FIG. 8a.

FIG. 8c is a cutaway view of the semicircular sleeve of FIG. 8a.

FIG. 8d illustrates a special case of the Soddy Circle configuration.

FIGS. 10 A, B and C are section views of a preferred embodiment of a pre-polished connector incorporating this invention.

FIG. 10A shows a ferrule holder with a bore designed to contain the 3-rod bundle. A fiber stud is in place and ready for further processing.

FIG. 10B is the end product of a pre-polished ferrule fiber stud assembly.

FIG. 10C shows a collets and push cap for a 900 um buffered field fiber cable that incorporates the fiber stud assembly of FIG. 10.

FIG. 15A illustrates an alternate Soddy Circle configuration wherein the rod sizes are adjusted to offset the aperture axis from the center by a specified distance.

FIG. 15B illustrates an alternate Soddy Circles configuration with an additional flat insert that creates a second precision aperture to accommodate a second fiber stud and precision fiber spacing.

DETAILED DESCRIPTION OF THE INVENTION

Figure 4:
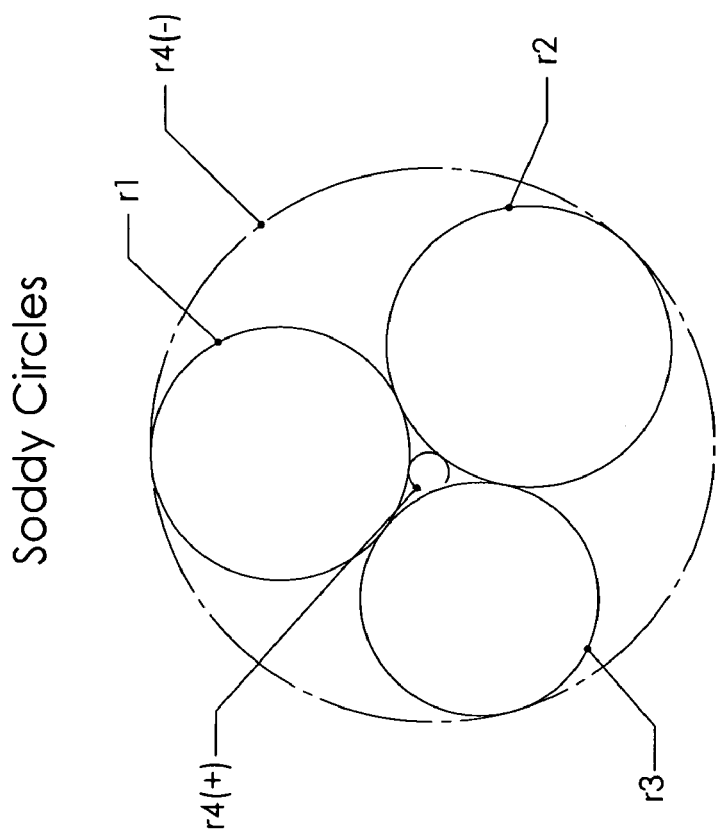
FIG. 4 depicts the Soddy circle formulation involving 3 mutually tangent circles plus inner and outer circles.

Normally, a long, straight and precise channel that matches the optical fiber size is needed to facilitate fiber optics cable mechanical splicing. FIG. 1 shows the necessary optics fibers' physical alignment requirements for coupling that will result in no/or minimum optical power loss. In the case of single mode optical fibers, the radial offset 110 should be less than 10% of the wave guide core diameter (generally 0.009 mm), i.e., less than 0.001 mm for single mode fiber optics. The angularity offset 120 should be 2 degrees or less, and the lateral offset 130 should be (20%) 0.002 mm or less. If these requirements are satisfied, the coupling loss will be within acceptable limits, i.e. limited to 0.3 dB or less.

FIG. 2A illustrates a prior art mechanical splicer 250. Extensive effort was made to create a straight through bore hole 230. If the bore hole size 230 is too loose, then the fibers will not properly align and therefore will not meet fiber light optical coupling power loss requirements. If the bore hole size 230 is too tight, then the fiber cannot be inserted and will result in breakage. If we consider the use of single mode fiber with a size tolerance of 0.125+/−0.0005 mm, only if the bore hole size's 230 is 0.1255 mm with a precision of +0.0005 mm and −0.000 mm, will the splicer work well. But actual experience has revealed that it is not only difficult to fabricate such a precise bore hole, but also that the construction of a vent hole 260 is necessary to prevent an air piston effect that would otherwise create a large gap 210 (lateral offset) between butted fiber studs, which causes excessive coupling power loss. FIG. 2B illustrates another prior art mechanical splicer that tries to resolve this air venting problem during splicing with a special transfer technique. Two optical fibers 100 are inserted into bodies 200 so that they are flush with surfaces 240. Then two such assemblies are brought together and butted against each other on end faces 240. After the fibers are aligned, the operator pushes one of the fiber studs 100 forward into the other body 200, thus mating the assembly and finishing the splicing. However, the splicer of FIG. 2B is hard to use and has limited applications.

FIG. 2C illustrates a prior art mechanical splicer that avoids the use of a precision straight bore hole by utilizing a V or U groove insert 280 along with a compliance flat insert 270 wrapped by sleeve 290. The V aperture 285 usually is smaller than the fiber size by design so that the flat insert 270 made of compliance material can force the optical fibers to align with the V groove 285. However, in reality, it is very difficult to control the aperture size just right. It is either too tight and the optical fiber cannot or is difficult to be inserted, thus causing fiber breakage, or it is too loose and causes excessive optical loss. FIG. 3A illustrates a typical prior art V groove design which uses a press plate 310 to push fibers to align against a V groove 316 after optical fibers 100 are butted together. In this way, the lack of a precise V aperture will not cause fiber breakage during insertion, but the clamping and triggering mechanisms that are needed present problems. The plate 310 exerts strain on fibers 100, which causes issues such as (PDL) Polarity Dependent Loss that are a detriment to performance. This effect is described in *Stress effects on the performance of optical waveguides, International Journal of Solids and Structures, volume* 40 *Issue* 7, April 2003, Pages 1615-1632 by M Huang.

FIGS. 3B and 3C show two prior art mechanical splicers that use rods 311 instead of using the V or U groove, as guiding features for fiber stud alignment. These prior art splicers either employ a loose bundle of rods with sizes that are not controlled precisely enough to yield an aperture size dimension within 0.0005 mm, or they require the use of very precise rods, which is not practical for commercial products. Therefore, these designs all must ultimately rely upon undersized apertures that require loosely assembled rod bundles and additional clamping and actuating mechanisms to allow fiber stud insertion and to achieve final fiber stud splicing. FIG. 3B illustrates 3 rods 311 that are bundled together loosely for fibers to be inserted, after which a mechanism such as heat shrinkable tubing is used to wrap the bundle together 312. As it can be seen, this rod arrangement does not control precisely enough the constraining points 321 to define the aperture and enable the fiber position to remain stable, which will not yield consistent splicing results. FIG. 3C illustrates a 2 rods and one press plate 313 design that has similar shortcomings to the V groove design of FIG. 3A. Prior arts that call for the use of rods with very precise mechanical tolerance (+/−0.00001") based on the calculation of 3 equal sized rod bundle, increase the piece part cost dramatically. FIG. 3D is another typical mechanical splicer design that uses a half circle insert with V or U groove 370 and half circle flat inserts 320 which are assembled loosely with a clamp 360 in an unclamped condition. Clamp 360 clamps the inserts together after the insertion of the optical fiber. In this design, the optical fiber 100 can be inserted easily. Once the fibers 100 are butted against each other, a cam mechanism or pry 350 releases the clamp 360 so that the flat insert 320 will push the fiber studs against the V groove and align the optical fibers. It is common to have either the V groove insert 370 and/or the flat element insert 320 made of elastic material so that it can be molded and provide mechanical compliance when the clamp 360 is released. The FIG. 3D design is easier to use than the designs of FIG. 3A or 3C, since its clamp mechanism is ready to activate and completes the splicing. But these structures are intricate and must be made of molded plastic material, with the associated high tooling cost of a stamped and formed metal clamp, in order to reduce the cost of fabrication. This limitation restricts this type of design to either flimsy or complicated mechanical structures and causes it to suffer from inconsistent splicing performance due to its lack of rigidity. There are further numerous designs similar to the method described above, each differing in terms of how to clamp, and how to activate clamp and so on, but suffering from the same shortcomings.

The present invention utilizes the geometry known as Soddy Circles to provide a novel method and apparatus for positioning/holding or splicing fiber studs. This invention transforms a precision rod bundle to form a super precision small and straight virtual hole for optical fiber mechanical splicing, connector termination, or fiber holder devices.

FIG. 4 depicts the geometric model "kissing circles" of Descartes' theorem, which establishes the relationship for four mutually tangent circles. Frederic Soddy expanded it to a 3 dimensional tangent spherical model that is now known as Soddy Circles. The exact solution for two non intersecting circles that are tangent to all three circles with radii r1, r2 and r3 is:

$$r_r^{\pm} = \frac{r_1 r_2 r_3}{r_1 r_2 + r_1 r_3 + r_2 r_3 \pm 2\sqrt{r_1 r_2 r_3 (r_1 + r_2 + r_3)}}.$$

Where r4 (+) is the inner Soddy circle radius and r4 (−) is the outer Soddy circle radius.

FIG. 5A illustrates a cross sectional view of the present invention utilizing the Soddy Circle geometry. Three rods 510, 511, 512 are arranged in accordance with the Soddy Circles geometry to yield an aperture 520 for the mechanical splicing of optical fiber 100. Furthermore, the sleeve ID size 550 encasing the rods bundle can also be determined. Corresponding to the Soddy Circles formula, the r1, r2 and r3 are radii of straight rods 510, 511 and 512 the r(−) is the radius of sleeve ID 550, and the r(+) is the radius of inner aperture 520, into which fiber 100 will be inserted. So three straight rods 510,511,512 of either the same or of different sizes are bundled together and constrained by the sleeve 530 in such a way that each rod touches and is tangent to the other two rods. In the center of this rod bundle, one can see a triangular passage which forms a precise and straight virtual hole, or aperture, for the optical fiber 100, and which touches and is tangent to all three rods 510,511, and 512.

Significantly, the invention's use of generalized Soddy Circles, rather than the planar geometry of 3 equal size circles as used by prior arts (which is a special case of Soddy Circles), solves a problem presented by the mechanical tolerance of both the rods and the fibers. Specifically, by allowing different sized circles according to the Soddy Circle formulation, I have been able to achieve better results, e.g., by the bin method which will be described hereinafter. With modern state of art of fabrication, a steel rod with a diameter less than 1 mm can be controlled to within +/−0.003 mm (+/−0.0001") at much higher cost than the standard tolerance of +/−0.006 mm. This means that, using the 3 equal sized circle method of prior art, the virtual hole size (the aperture) r4(+) can be controlled to within 0.001 mm at best. Table 1 below illustrates how potential values for the radii of the 3 rods would correspond to the inner and outer Soddy circles' radii.

TABLE 1

| r1 | r2 | r3 | r4(+) | r4(−) |
|---|---|---|---|---|
| 0.807 | 0.807 | 0.807 | 0.1248 | 1.7388 |
| 0.810 | 0.810 | 0.810 | 0.1253 | 1.7453 |
| 0.813 | 0.813 | 0.813 | 0.1258 | 1.7518 |

However, in everyday practice, controlling the aperture diameter to within 0.001 mm of tolerance per table 1 is not tight enough tolerance to guarantee that the fiber studs can be inserted and meet performance requirements each and every time. This is due to the fact that the fiber size itself also possesses +/−0.0005 mm of tolerance. It will be impossible to insert fiber studs into the aperture if the rods happen to be on the undersized side and fiber on the oversized side of tolerances, because the aperture will be too small. Or vice versa, fiber studs will be misaligned due to an oversized aperture. Either way the splicing performance will thereby suffer. So, given the limits of controlling aperture size to within 0.001 mm tolerance, there remains a 30% chance that a fiber may not be able to be inserted into the aperture or that the aperture might be too loose and thus unable to meet the optics fiber splicing physical requirements illustrated in FIG. 1. This is not acceptable for commercial products. Thus, tighter aperture size tolerances, e.g., to within 0.0005 mm, must be achieved in order for this rod bundle arrangement to be useful as a single mode fiber optics mechanical splicer.

As part of the present invention, a method for providing more precise aperture sizing, while allowing much looser tolerances of the rod diameters, has been developed. Whereas it is very costly and impractical to hold the manufacture of the rods to a very tight tolerance, it is simple, fast, and very inexpensive to accurately measure the actual sizes, i.e. diameters, of the fabricated rods. By using a more general form of the Soddy Circles formulation, which accommodates differing circle sizes, the central aperture diameter can be easily determined. According to the present invention's method, rods are manufactured according to manufacturing specifications and tolerances that are looser in requirement and therefore much more cost effective. Then the fabricated rod diameters are measured and sorted into multiple bins according to the actual diameter measurements. If the diameters of the three rods are properly chosen from the bins, the variation of the aperture diameter can be controlled to a much higher degree than the variation of the rod diameters. Furthermore, the variation of the aperture diameter can be precisely controlled to be at least as small as it would be if one were able to manufacture the rods with an extremely tight tolerance such as +/−0.001 mm (0.00004") (an impractical and expensive technique). Thus, the bin method allows for the creation of a very accurately sized aperture for the fiber while eliminating the need of rods with very tight tolerance requirements.

By way of example, assume that the nominal rod diameter is 0.812 mm with a very tight manufacturing tolerance of +/−0.001 mm. These numbers would nominally be applicable for a required aperture size of just over 0.125 mm, e.g., to splice a fiber of diameter 0.125+/−0.0005 mm. Table 2 shows the aperture diameter if the three rods were of the same size, at the tolerance limits as well as at the nominal diameter value:

TABLE 2

| Rod size variation from nominal (mm) | R1 diameter (mm) | R2 diameter (mm) | R3 diameter (mm) | R4(+) diameter (mm) | R4(−) diameter (mm) |
|---|---|---|---|---|---|
| −0.001 | 0.8110 | 0.8110 | 0.8110 | 0.1254 | 1.7475 |
| Nominal | 0.8120 | 0.8120 | 0.8120 | 0.1256 | 1.7496 |
| +0.001 | 0.8130 | 0.8130 | 0.8130 | 0.1258 | 1.7518 |

In contrast, Table 3 shows the aperture diameter according to the Soddy Circles formulation if the three rods are of differing sizes, chosen from 4 bins so as to optimize the aperture size. A six times looser manufacturing tolerance for the rods, i.e. +/−0.006 mm, is used, so for a nominal rod diameter of 0.811 mm, the actual rod sizes range between 0.805 nm and 0.816 nm. The rod diameters as sorted into the bins are as follows: (with measurement increments of 0.001 mm, and range of each bin is 0.003 mm)

Bin 1≧0.805<0.808 mm Min. 0.805 Max 0.807

Bin 2=0.808<0.811 mm Min. 0.808 Max 0.810

Bin 3=0.811<0.814 mm Min. 0.811 Max 0.813

Bin 4=0.814<0.817 mm Min. 0.814 Max 0.816

Table 3 shows the diameters of the inner aperture and outer sleeve for rods at the minimum and maximum of the tolerance ranges, but chosen from different bins so as to optimize the aperture diameter. Three different bin combinations are shown: 2, 3, 4; 1, 4, 4; and 3, 3, 3.

TABLE 3

| Bin combination (max or min) | R1 diameter (mm) | R2 diameter (mm) | R3 diameter (mm) | R4(+30) diameter (mm) | R4(−) diameter (mm) |
|---|---|---|---|---|---|
| 2,3,4 (min) | 0.808 | 0.811 | 0.814 | 0.1255 | 1.7475 |
| 2,3,4 (max) | 0.810 | 0.813 | 0.816 | 0.1258 | 1.7518 |
| 1,4,4 (min) | 0.805 | 0.814 | 0.814 | 0.1255 | 1.7475 |
| 1,4,4 (max) | 0.807 | 0.816 | 0.816 | 0.1258 | 1.7518 |
| 3,3,3 (min) | 0.811 | 0.811 | 0.811 | 0.1255 | 1.7475 |
| 3,3,3 (max) | 0.813 | 0.813 | 0.813 | 0.1258 | 1.7539 |

It is clear from looking at the R4(+) column, that, by choosing the proper bin combinations, a very tight aperture size distribution can be achieved (within 0.0003 mm for this example), even with loosened manufacturing tolerances. The minimum aperture diameter can be essentially exactly predicted, even though several different bin combinations can be used, thus greatly lowering the cost. The outer circle diameter R4(−), which corresponds to the sleeve diameter, is also very tightly distributed (within 0.004 mm for this example).

As a result of this exactness and predictability of the inner aperture diameter and outer sleeve diameter, the rods can be rigidly held by a sleeve, as is described hereinafter. This is contrast to prior arts which necessitate a loosened fit (loose rod bundle) while inserting the fiber and subsequent tightening using a clamping mechanism after insertion, which tends to cause fibers butting position shift and excessive strain exerted. The present invention's ability to use a sleeve to house the rod bundle eliminates this inconsistent and often complicated clamping mechanism.

The proper rod length may be designed to minimize angular offset for the fiber splicing. The interstitial space 520 between the rods and fiber provides an air passage which renders a fabricated vent hole or special transfer procedure, as depicted in prior arts, unnecessary.

FIG. 5B depicts an isometric view of a rod bundle 50 constrained by a sleeve 530. A properly cleaved optical fiber 100 can be inserted with the aid of the chamfered opening 540 from one end of the rod bundle. The sleeve 530 usually is made of softer material than the rods itself and with a slightly undersized inside diameter 550 such that the rod bundle 50 can be fitted with light interference fit and held tightly inside the sleeve. The sleeve size is based on the outer Soddy Circle and the slightly undersized sleeve ID enables looser sleeve ID tolerance toward the smaller size. The mating optical fiber 100 can be slid into the same precise virtual hole from the other end of the bundle 50, and the two can be butted against each other at the middle of the bundle as it is shown in FIGS. 6A and 6B. FIG. 6A is a cross sectional view along a longitudinal direction of an embodiment of this invention. It shows two optical fibers guided by chamfer 540, aligned by precision aperture 560, and spliced in the middle of the rod bundle. FIG. 6B is the detail view of the splicing interface 210. This invention allows the optical fibers' alignment to be achieved automatically through the guidance of the precision aperture formed by the three-rods bundle of this invention. The operation of mechanical splicing is reduced to simply butting the fibers together in a longitudinal direction during and after the splicing process without any extra clamping and actuating mechanism.

Another useful embodiment of the present invention has practical application particularly for the temporary splicing in the laboratory. FIG. 7A is the end view of an alternate embodiment of the invention utilizing an undersized aperture with elastmor lining the sleeve housing the rod bundle 108. The rod 510 sizes are selected so that aperture 560 is undersized relative to the size of fiber 100 by a desired amount. Since the aperture size can be very precisely controlled using the configuration of this invention, the amount of compliance needed for fiber insertion can be controlled very precisely). The elastic material 108 of proper hardness lining the sleeve and its inside diameter 620 is designed to provide compliance for insertion and interference with the rod bundle such that provides compliance for the fiber insertion. Thus, the undersized aperture expands to accommodate the fiber. Due to the radial compliance of the elastic material 108 and the holding forces of friction, this configuration will hold the bundle tightly and maintain the desired aperture size. During fiber insertion, the fiber can push the undersized aperture opening so that it not only can accommodate the fiber with well controlled fiber insertion resistance, but also provides fiber retention force for temporary mechanical splicing. This is an improvement over prior methods such as those depicted in FIG. 2c, for which fiber breakage is a major issue, as it is very difficult to control the right amount of interference between the fiber and V groove. FIG. 7B is an external view of the embodiment of FIG. 7A.

FIG. 8A illustrates another embodiment of the inventive rod bundle design. It utilizes two rods 820, 821 and a semi-circular insert 800 inside the sleeve 830. Alternately this configuration can be achieved using a semi-circular bore hole sleeve. This configuration is a special case of Descartes' theorem wherein one of the three tangent circles is replaced by a straight line, i.e. a circle with zero curvature, or infinite radius. The Soddy circles formula expressed in terms of the curvatures k1, k2 and k3 of the tangent circles rather than their radii is:

$$k_4 = k_1 k_2 k_3 \pm 2\sqrt{k_1 k_2 + k_2 k_3 + k_3 k_1}.$$

If k3=0, i.e., circle 3 is a straight line, the relationship simplifies to:

$$k_4 = k_1 + k_2 \pm 2\sqrt{k_1 k_2}.$$

For example, if rods 1 and 2 each have a radius of 0.25 mm, corresponding to curvatures k1 and k2 of 4 mm, k4, corresponding to the curvature of the aperture for mechanical splicing, is 16 mm. Such an aperture matches a single mode optics fiber with a diameter of 0.125 mm. The outer circle (r4−) is a straight line 890. There exists one exact geometric solution for sleeve ID 835, which is 0.5625 mm in this example. The sleeve ID 835 is concentric with the precision aperture and tangent to both rods 820, 821. The flat surface of insert 800 is offset by one fiber radius r(+) from center, with the same radius as sleeve ID 835. FIG. 8B illustrates an isometric view of this embodiment and FIG. 8C is an isometric view of semi circular inserts 800 with a chamfer 810 to facilitate easy insertion. The similar pin size bin sorting approach used for the 3 rods bundle configuration can be utilized in this embodiment also, to allow for looser mechanical tolerance. Instead of specifying pin size tolerance within +/−0.001 mm, one can match pins from different bins to specify the pin size tolerance to be within +/−0.003 mm and thereby control the aperture size to within 0.0005 mm.

The advantage of this design is that the splicer bundle (i.e., the two rods 820, 821) is smaller than the 3-rod bundle, so it is highly suitable for small form factor pre-polished optical connectors. The flat semi-circular insert 800 can be made of either the same material as the rods so as to create an aperture of the exact clearance size required, or made of elastic material, so that the proper sizing of rods 820 can be used to create any desired undersized aperture. FIG. 8D depicts rods 820 digging into an elastic semi circular insert 800 and creating an undersized aperture 840 that offers the same advantage as the FIG. 7 design with elastic lining 820. The hardness of the elastic material and the amount of undersizing for the virtual hole can be optimized so that the fiber can be inserted with proper compliance and without fiber breakage. The elastic insert 800 pushes optical fibers 100 against the rods 820 to align optical fibers for splicing. It is also desirable for the sleeve 830 and insert 800 to be molded with engineering plastic as a one piece semi-circular bore sleeve, to reduce the part count.

Because this invention's splicing process involves no moving clamping or actuating parts used to press the fiber against any flimsy alignment features, a stable and stiff mechanical splicer is realized with robust functional performance during and after splicing, even under adverse environmental conditions.

Figure 11:
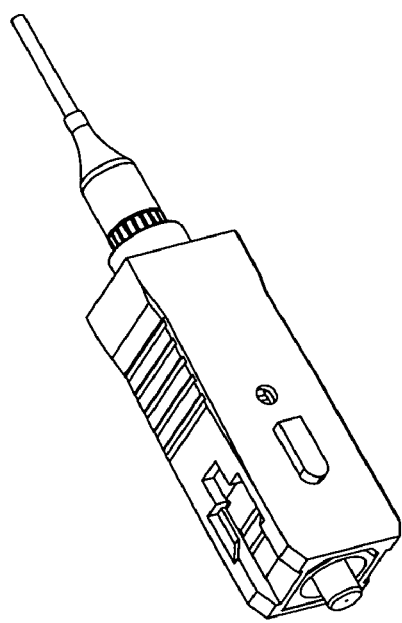
FIG. 11A illustrates an isometric view showing a terminated pre-polished fiber optics of an SC connector splicing with a field cable.
FIG. 11B is a cross sectional view of the connector of FIG. 11A, incorporating the present invention with a pre-polished ferrule fiber stud and mechanical splicing with a field cable.
Figure 11:
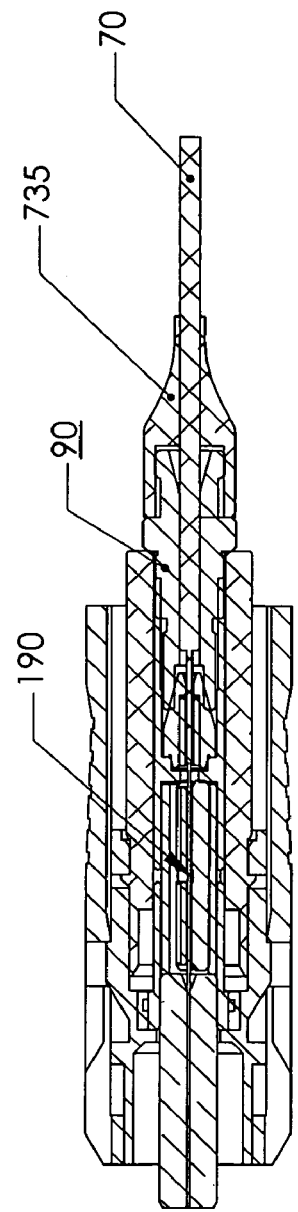

The present invention's described rod bundle for use in an optical fiber mechanical splicer can be easily incorporated with a pre-polished ferrule and a fiber stud as a pre-polished connector for field connector termination applications such as that which is illustrated in FIG. 11. This rod bundle 50 also can be incorporated with a fiber holder device such as that shown in FIG. 13A. The outside diameter (OD) 136 of the sleeve is concentric with the inside bore diameter 131 (ID) and consequently concentric with the optical axis of optics fibers 134. The sleeve OD 136 can be a datum and referenced easily for the alignment of the fiber position of the fiber holder for further fiber processes. Since the rod bundle of this invention can hold a fiber straight at a very precise position corresponding to the fiber holder's datum, it enables an operator the freedom to be solely concerned with the axial direction for sensing or focusing and alignment, rather than worrying about 3 or 4 different translating and rotating manipulations of the fiber. FIG. 14 illustrates a fiber optics device that incorporates the inventive rod bundle 142 to hold a fiber 700 steady and straight. It is installed with a passive or active optical component 145 and its mounting position 143 can be concentric with the holder's OD 152 and consequently the rod bundle 142 and fiber position can be controlled very precisely. The desired location of the fiber end face 151 can be easily adjusted. FIG. 15A illustrates that one also can construct a fiber holder with an off-center optics fiber axis by combining different sizes of rods 149 and 150 based on the Soddy Circles geometry model. FIG. 15B illustrates that one can also add an additional semi-circular insert to create another precision aperture for dual fiber holding with precision spacing. The dual fiber holder of this invention will greatly simplify the package design applicable to fiber optics emitting and sensing in a single package.

DESCRIPTION OF THE PREFERRED EMBODIMENTS

Figure 9A:
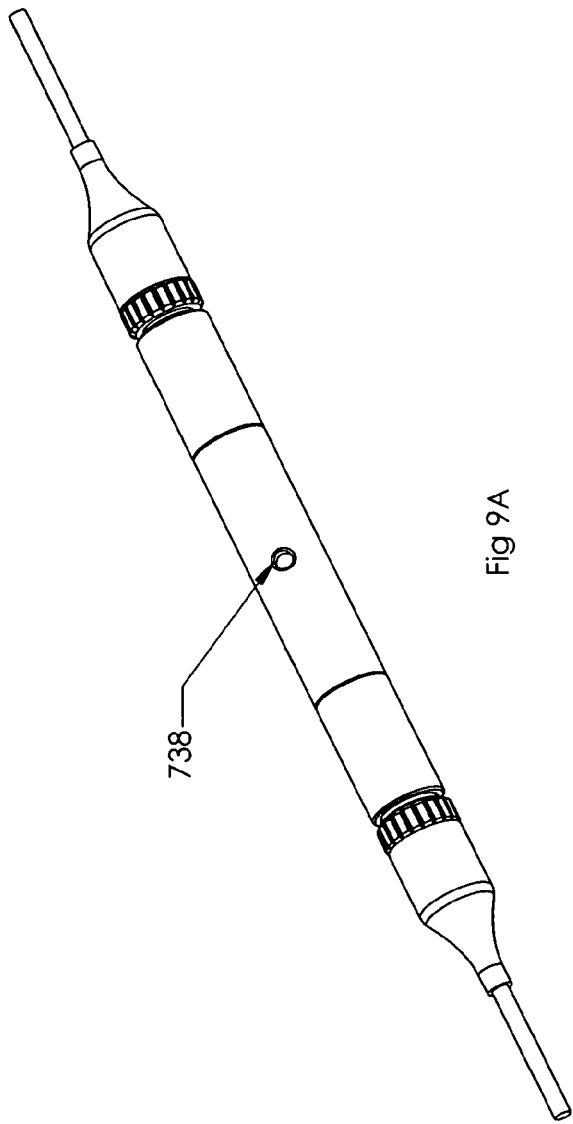
FIG. 9A is an isometric view of a preferred mechanical splice embodiment.

FIG. 9A illustrates a preferred mechanical splicer embodiment in an isometric view. A small window 738 is shown which facilitates visual inspection of the splicing quality. FIG. 9B shows a cutaway view that depicts the detailed structure of the splicer of FIG. 9A. Optical cables 700 are stripped and cleaved to proper length to expose bare fiber 100 for splicing. The end face 210 is usually coated with optical index gel to reduce the Fresnel reflection loss. A three rod bundle 50 is assembled by selecting proper rod sizes from bins to construct a precision aperture that accommodates the specific size of fibers to be spliced. Bundle 50 is confined by a cylindrical main body 730 with a through bore size 731 corresponding to the outer Soddy circle size. In practice, the main body is made of softer material such as brass with tolerance of bore 731 specified +0.000/−0.010 mm so the rod bundle can be pushed in readily with tight fit. The bore 731 also can be coated with compliance material 739 such as silicone rubber so the bore 731 tolerance can be even more generous. Two end housings 720 pre-assembled with collets 740 can be either screwed or press fitted into the main body 730 so that rod bundle 50 is contained in a lateral direction inside the main body also. End caps 710 are assembled by slide fit or screw thread 770 into end housings 720 and the collets 740 are not tightened yet by the end cap fillet 737 until the actual splicing occurs, as described below. Collets 740 is located concentrically on one side of end housing 720 with clearance hole 732 to allow fiber to be inserted through the end cap's chamfer opening 910. During operation, tools are use to hold two fiber studs meet and butt against each other in the middle location of rod bundle 50, end caps 710 can be further advance and push fillet 737 on the collets' chamfer 790 to tighten the collets, either by screw operation or by the activation of a spring. Consequently the collets will hold fiber tightly near location 750. In addition, boots 735 are installed on end caps 710 and serve as strain relief for cables 700.

FIGS. 10A-10D show a preferred embodiment of a pre-polished connector ferrule holder incorporating the mechanical splicer of this invention. FIG. 10A shows a ferrule holder 165 with a bore 170 designed to contain the 3-rod bundle 160. The bore may alternately be coated with elastic material to achieve more mechanical compliance to contain the 3-rod bundle 160. After the rod bundle 160 is press fitted inside the bore 170, the ferrule 155 is press-fitted into the insertion hole 180 of the ferrule holder to fully contain the rod bundle 160. The fiber stud 163 is inserted into ferrule from surface 166 and the cleaved end 190 is properly positioned in the middle of mechanical splicer rod bundle 160 before epoxy bead 161 is applied and cured to secure the fiber stud. The excess fiber protruding out of the end-face 166 will be cleaved off after the epoxy bead 161 is cured, and readied for factory polishing. FIG. 10B shows the end product 80, a pre-polished ferrule fiber stud assembly, produced by the apparatus of FIG. 10a. Index-matched optical gel is typically applied at the cleaved end 190 to reduce Fresnel reflection, which typically improves single mode transmission loss. FIG. 10C shows a pre-polished ferrule fiber stud assembly 80 assembled with collets 740 installed and end cap 710 that was screwed in through thread 770. FIG. 10C constitutes the SC pre-polished connector guts 90 for 900 um buffered field fiber cable.

Figure 9:
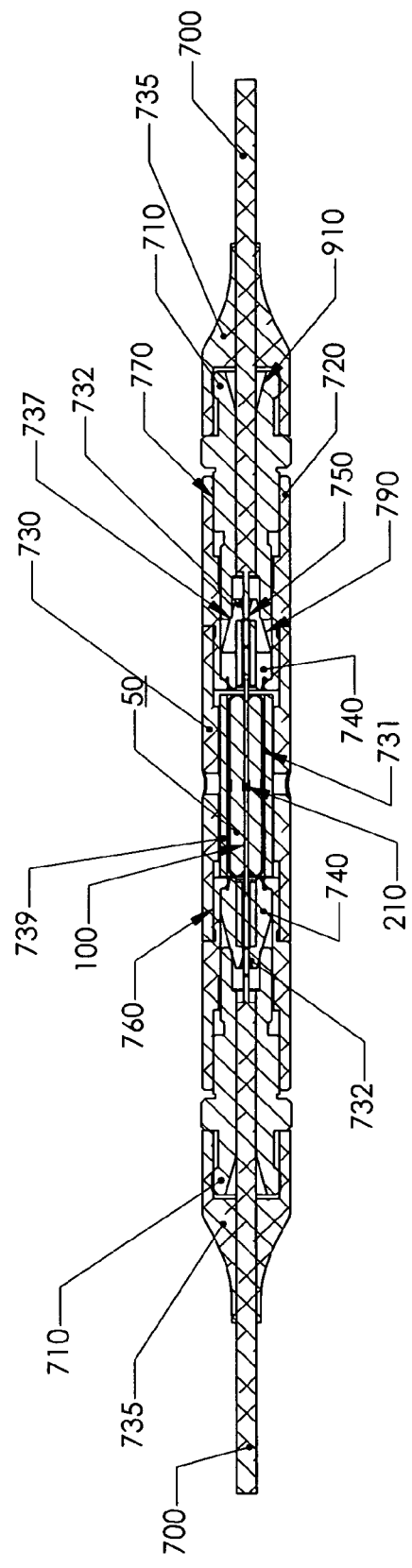
FIG. 9B is a cutaway view of the embodiment of FIG. 9a showing a detailed view of the construction incorporating this invention.

FIG. 11A is an isometric view of a widely used SC style fiber optics connector with 900 um cable, incorporating the mechanical splicer of the present invention. FIG. 11B is a cross section view of the SC style connector of FIG. 11A. It incorporates the pre-polished ferrule fiber stud connector guts 90 of FIG. 10C to terminate field cable 70, similar to a mechanical splicer such as that shown in FIG. 9.

Figure 12:
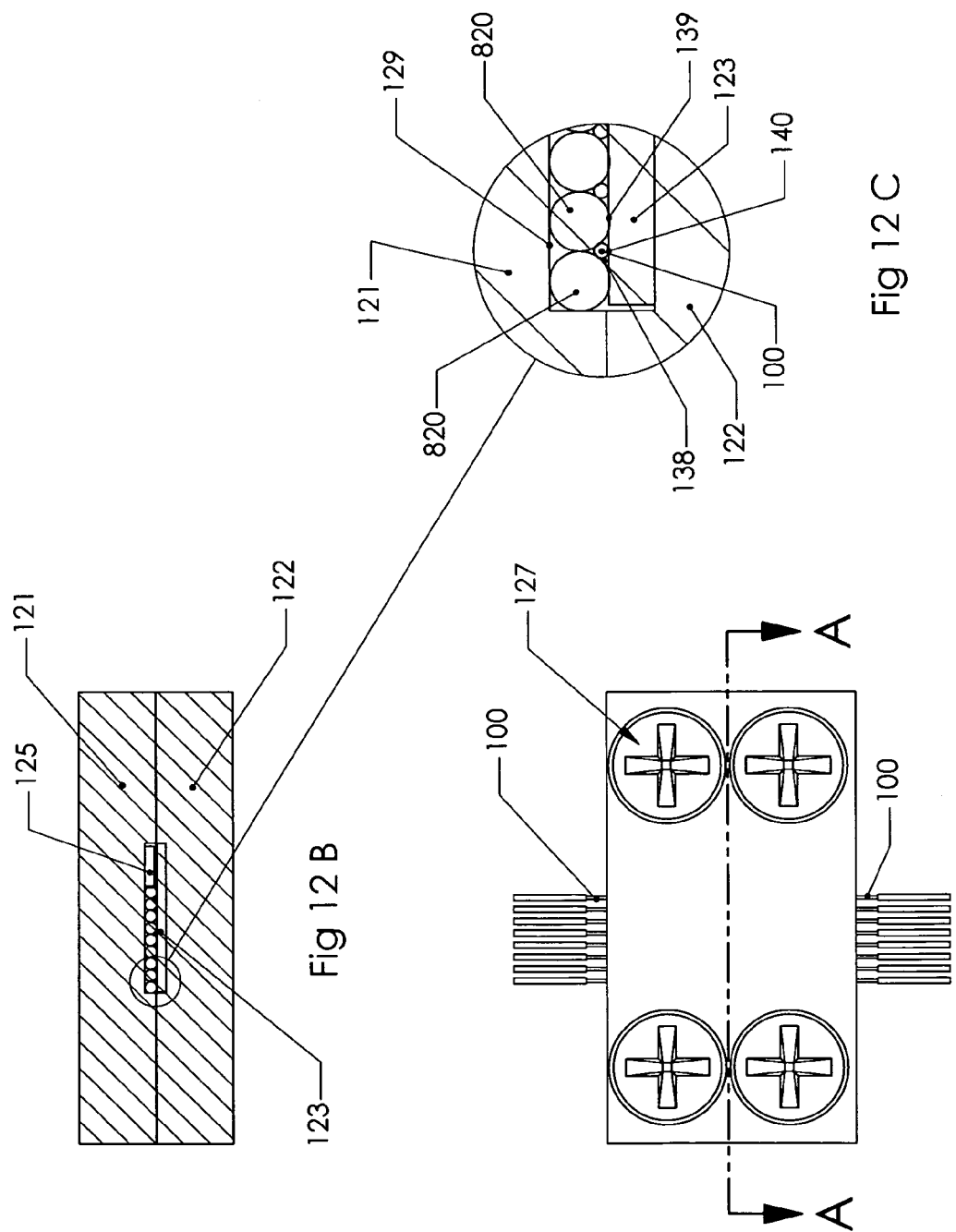
FIG. 12A is a top view of an embodiment of a multiple fiber mechanical splicer.
FIG. 12B is a cross sectional view of the embodiment of FIG. 12A.
FIG. 12c is a detailed view of a portion of FIG. 12b including an embedded polished flat sheet and an array of rods.

FIG. 12 is an embodiment of a multiple fiber mechanical splicer. FIG. 12A is the top view, FIG. 12B is a cross section view along cut AA, and FIG. 12C shows the detail view of a half shell 122 with an embedded polished flat sheet 123 and an array of rods 820 nested in the U channel 129 of the other half shell 121. Two half shells can be screwed together such that the rod arrays are pushed against the flat surface 139 of a flat sheet 123 to form an aperture that precisely fits the fiber optic stud 100. This is accomplished by using the Soddy Circles formulation, assuming zero curvature (or infinite radius) for one of r1, r2, or r3, (which we will arbitrarily set as r3) as well as the outer circle r4–. r3 corresponds to flat surface 139, r4– corresponds to the constraining flat surface 129. The appropriate sizes of rods 820 are calculated accordingly. By implementing bin sorting according to rod sizes as suggested by this invention, the precision of aperture is also enhanced. In practice, the flat sheet 123 is made of polymer to provide compliance along with a spring structure 125 to bias the rod arrays 820 so that they will push against each other to ensure that the rods are tightly packed. For N+1 rods, there are N precise aperture holes formed and it is possible to construct an N multi-fiber mechanical splicer. In addition, the flat sheet 123 elasticity creates a frictional retaining force for fibers butted against each other. It is needed for a temporary dense fibers' splice array. The hardness of the flat sheet 123 can be optimized so that the fiber may be inserted with little effort without breakage, and the radial, angular and lateral offsets will still meet performance requirements.

Figure 13:
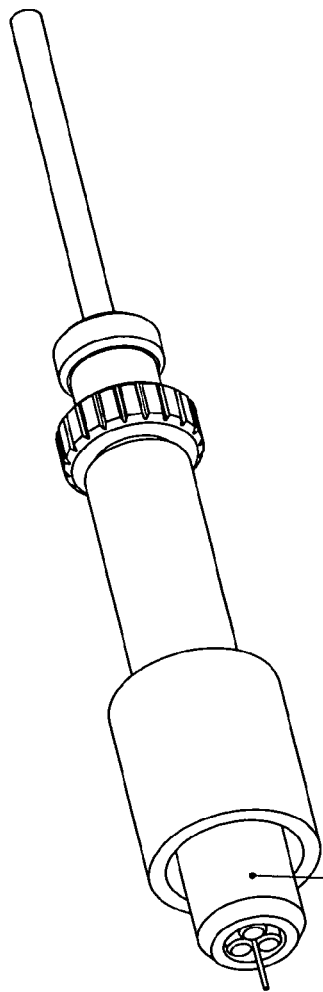
FIG. 13A is an isometric view of a fiber holder embodiment utilizing the present invention.
FIG. 13B is a cross sectional view of the fiber holder embodiment of FIG. 13a depicting the rod bundle press fitted into the fiber holder's inner bore hole and holding and guiding a fiber in an axial direction.
Figure 13:
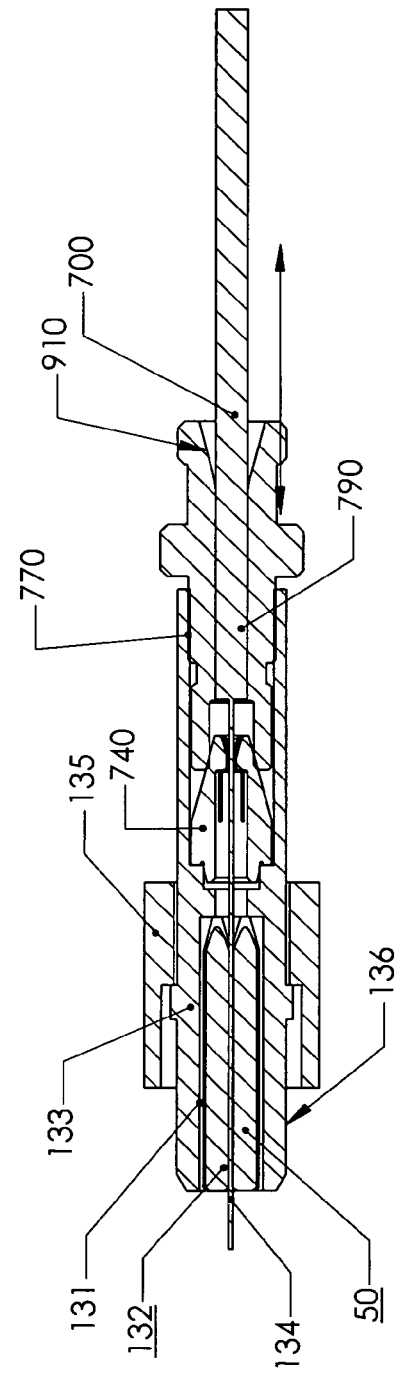
Figure 14:
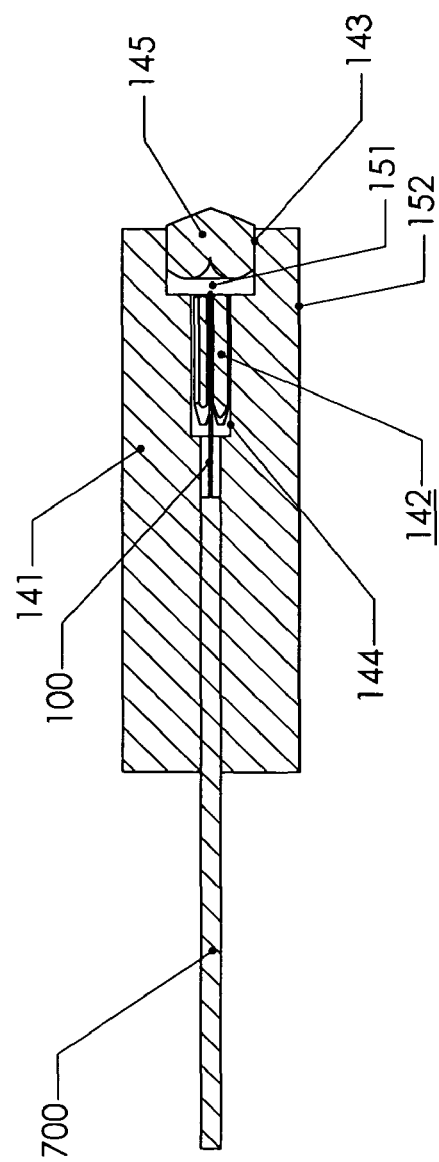
FIG. 14 is a section view of an optical fiber device embodiment incorporating this invention to hold the fiber in a stable and precise center position relative to the sleeve OD and the optical device.

FIG. 13A is an isometric view of a fiber holder embodiment utilizing the present invention. FIG. 13B is the cross section view depicting rod bundle 132 (r1, r2, r3) press fitted into an inner bore 131 (r4–) of fiber holder housing 133. The rods size selected are determined by the aperture size that controls fiber stud and aperture clearance. The fiber stud or cable 700 slips along the chamfered opening of a rear cap 910, through a collar 740 and is guided by the precision aperture of the rod bundle 132. The fiber holder housing OD 136 is made concentric with the bore hole 131 with great precision. Consequently the virtual hole created by the rod bundle 132 is concentric with the fiber holder datum OD 136. This way, the radial position of the fiber 134 is held precisely relative to the datum 136. The fiber 134 can be moved back and forth in a longitudinal direction for further fiber manipulation with precise concentric positioning. Collar 740 locks the fiber in position without any pulling or bending forces imposed on the fiber. Such forces can cause detrimental optical performance, such as high polarization dependent loss. In this embodiment, the fiber holder body can be designed to incorporate features of common fiber optic connectors, such as a FC connector's style threaded nut 135 to mate and screw into an FC connector adaptor port. This design enables the adjustment of the fiber in a longitudinal direction that facilitates accurate optical sensing, focusing, attenuation or other processes such as fiber lens or polishing processes and so on.

FIG. 14 illustrates an embodiment in which a fiber optics device 141 with a bore hole 144 (r4–) for a rod bundle 142 (r1, r2, r3) as per the present invention. Provisions 143 can be fabricated concentric with the bore 144 with great precision to hold a passive or active optical component 145 concentrically. A fiber cable 700 is inserted and guided by the rod bundle 142 and aligned, coinciding with the optical axis of the passive or active component 145. This embodiment simplifies optical alignment greatly.

FIG. 15a illustrates yet another fiber holder embodiment that the optical axis could be eccentric from datum 155 at a specific desired distance 149 by selecting the proper rod sizes according to the Soddy Circles formula. FIG. 15B illustrates that, by adding an additional half circle flat insert 800, an additional precision aperture is created for holding another fiber. This is a dual fiber holder with specific fiber spacing for further optical processing and sensing in the same package.

In summary, the present invention utilizes a bundle of properly selected straight rods, which are easy to fabricate because of decreased demand for tight mechanical tolerance, to form a very precise straight virtual hole for fiber optics stud mechanical splicing. By applying the Soddy Circles geometry formula, exact aperture size with optimal clearance for the optics fibers mechanical splicing can be calculated. The sleeve size also can be determined accurately so the clamping and actuating mechanism to wrap the rod bundle is not necessary. Prior methods of forming such an aperture have been in the form of a bore hole or groove formed through a solid block of material, which is very difficult to fabricate. Other prior methods call for the rod sizes of the rod bundle to be ultra-precise and thus increasing cost to the extent of impracticality. By contrast, the present inventive rod bundle is cost-effective and can be used in a mechanical splicer, pre-polished connector, or fiber holder. From the exact solution of the Soddy Circles formula, one can construct the rod bundles to fit any size of light guiding fiber with great precision. The aperture may be constructed easily and reliably, with great accuracy but still with controlled clearance for moving the fiber stud in the axial direction for splicing and processing with accurate alignment, without imposing un-necessary strain on fiber or causing fiber breakage.

It is not intended that the invention be restricted to the exact embodiments disclosed herein. Those skilled in the art will recognize that changes and modifications can be made without departing from the inventive concept. For example, one or two of the alignment rods may be made of elastic material and the others made of hard metal. Additional features can be added to the rods to facilitate visual inspection with a visible light source. Or, the collets can be fabricated from a soft metal such as brass. Additional features can also be incorporated to hold a 900 um and/or a 3 mm jacket. The scope of the invention should be construed in view of the claims.

With this in mind, I claim:

1. A method of forming a mechanical splicer of optical fibers, the method comprising:
    forming at least three rods;
    determining a radius of each rod and its deviation from a nominal radius;
    arranging the at least three rods into a plurality of bins, each bin comprising at least one rod and having a corresponding average rod radius value, wherein the plurality of bins are arranged according to the deviations from the nominal radius such that the corresponding average rod radius values increase from bin to bin;
    forming a sleeve having an inner radius;
    selecting a first rod having a first radius from the plurality of bins;
    selecting a second rod having a second radius from the plurality of bins;
    determining a third radius of a third rod using a formula based on the first radius of the first rod, the second radius of the second rod, a diameter of an optical fiber, and the inner radius of the sleeve, wherein the formula is a Soddy Circles formula; and
    selecting a third rod from a bin out of the plurality of bins such that the first rod, the second rod, and the third rod are secured through an interference fit inside the sleeve and form an inner opening, the optical fiber being inserted through the inner opening within a tight tolerance.

2. The method of claim 1, further comprising: selecting a material of the sleeve that is physically softer than a material of the at least three rods.

3. The method of claim 1, wherein: the first radius of the first rod is different from the second radius of the second rod.

4. A method of forming a mechanical splicer of optical fibers, the method comprising:
    forming a plurality of rods;
    determining a radius of each rod and its deviation from a nominal radius;

arranging the plurality of rods into the plurality of bins, each bin comprising at least one rod and having a corresponding average rod radius value, wherein the plurality of bins are arranged according to the deviations from the nominal radius such that the corresponding average rod radius values increase from bin to bin;

forming a sleeve having an inner radius;

selecting a first rod having a first radius from the plurality of bins;

selecting a second rod having a second radius from the plurality of bins;

determining a radius of at least one third rod using a formula based on the first radius of the first rod, the second radius of the second rod, a diameter of at least one optical fiber, and the inner radius of the sleeve, wherein the formula is a Soddy Circles formula; and selecting the at least one third rod from at least one bin out of the plurality of bins such that the first rod, the second rod, and the at least one third rod are secured through an interference fit inside the sleeve and form at least one inner opening, the at least one optical fiber being inserted through the at least one inner opening within a tight tolerance.

5. The method of claim 4, wherein:

the radius of the at least one third rod is different from one of the first radius and the second radius.

6. The method of claim 4, further comprising: selecting a material of the sleeve that is physically softer than a material of the rods.

* * * * *